US010395561B2

(12) United States Patent
Vara et al.

(10) Patent No.: US 10,395,561 B2
(45) Date of Patent: Aug. 27, 2019

(54) THREE-DIMENSIONALLY PRINTED INTERNAL ORGANS FOR CRASH TEST DUMMY

(71) Applicant: Humanetics Innovative Solutions, Inc., Plymouth, MI (US)

(72) Inventors: Thomas Matthew Vara, Norwalk, OH (US); Michael Scott Beebe, Norwalk, OH (US); Ime Victor Ubom, Southfield, MI (US)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 218 days.

(21) Appl. No.: 15/368,181

(22) Filed: Dec. 2, 2016

(65) Prior Publication Data

US 2017/0162077 A1 Jun. 8, 2017

Related U.S. Application Data

(60) Provisional application No. 62/264,107, filed on Dec. 7, 2015, provisional application No. 62/409,259, filed on Oct. 17, 2016.

(51) Int. Cl.
| | |
|---|---|
| *G09B 23/28* | (2006.01) |
| *G09B 23/30* | (2006.01) |
| *B33Y 10/00* | (2015.01) |
| *B33Y 50/02* | (2015.01) |
| *B33Y 70/00* | (2015.01) |

(Continued)

(52) U.S. Cl.
CPC ............ *G09B 23/30* (2013.01); *B29C 44/022* (2013.01); *B29C 64/106* (2017.08); *B29C 64/386* (2017.08); *B33Y 10/00* (2014.12); *B33Y 50/02* (2014.12); *B33Y 70/00* (2014.12); *B33Y 80/00* (2014.12); *G09B 9/00* (2013.01);

(Continued)

(58) Field of Classification Search
CPC ...... G09B 23/28; G09B 23/286; G09B 23/30; G09B 23/34
USPC ................................ 434/262, 267, 268, 272
See application file for complete search history.

(56) References Cited

U.S. PATENT DOCUMENTS

| | | |
|---|---|---|
| 3,664,038 A | 5/1972 | Searle et al. |
| 3,753,302 A | 8/1973 | Daniel |

(Continued)

FOREIGN PATENT DOCUMENTS

| | | |
|---|---|---|
| CA | 2881170 A1 | 8/2016 |
| CN | 101286188 B | 6/2010 |

(Continued)

OTHER PUBLICATIONS

Ramji Pandey, "Photopolymers in 3D printing applications", 2014 [retrieved onnline Oct. 12, 2018].*

(Continued)

*Primary Examiner* — Kurt Fernstrom
(74) *Attorney, Agent, or Firm* — Howard & Howard Attorneys PLLC (57) ABSTRACT

A three-dimensionally printed internal organ for a crash test dummy is made of a foam type material and has a plurality of defined and varied cell structures and is adapted to be disposed within a torso area of the crash test dummy to measure a regional pressure for the crash test dummy that provides for evaluation of potential abdominal injuries during vehicle crash testing.

27 Claims, 6 Drawing Sheets

(51) Int. Cl.

| | | |
|---|---|---|
| *B33Y 80/00* | (2015.01) | |
| *B29C 44/02* | (2006.01) | |
| *G09B 9/00* | (2006.01) | |
| *G09B 23/34* | (2006.01) | |
| *B29C 64/106* | (2017.01) | |
| *B29C 64/386* | (2017.01) | |
| *B29K 101/12* | (2006.01) | |
| *B29K 105/04* | (2006.01) | |
| *B29L 31/00* | (2006.01) | |

(52) U.S. Cl.
CPC .......... *G09B 23/34* (2013.01); *B29K 2101/12* (2013.01); *B29K 2105/04* (2013.01); *B29L 2031/702* (2013.01)

(56) References Cited

U.S. PATENT DOCUMENTS

| | | |
|---|---|---|
| 4,044,404 A | 8/1977 | Martin et al. |
| 4,261,113 A | 4/1981 | Alderson |
| 4,701,132 A | 10/1987 | Groesch et al. |
| 5,018,977 A | 5/1991 | Wiley et al. |
| 5,030,235 A | 7/1991 | Campbell, Jr. |
| 5,261,908 A | 11/1993 | Campbell, Jr. |
| 5,317,931 A | 6/1994 | Kalami |
| 5,518,407 A * | 5/1996 | Greenfield ............. G09B 23/30 434/267 |
| 5,526,707 A | 6/1996 | Smrcka |
| 5,620,326 A * | 4/1997 | Younker ................ G09B 23/28 434/268 |
| 5,741,989 A | 4/1998 | Viano et al. |
| 6,146,567 A | 11/2000 | Sachs et al. |
| 6,206,703 B1 | 3/2001 | O'Bannon |
| 6,439,070 B1 | 8/2002 | Beebe et al. |
| 6,610,429 B2 | 8/2003 | Bredt et al. |
| 6,623,687 B1 | 9/2003 | Gervasi et al. |
| 6,658,314 B1 | 12/2003 | Gothait |
| 6,749,433 B2 | 6/2004 | Kassai et al. |
| 6,931,951 B2 | 8/2005 | Wright et al. |
| 6,982,409 B2 | 1/2006 | Huang et al. |
| 7,086,273 B2 | 8/2006 | Lipmyer |
| 7,261,542 B2 | 8/2007 | Hickerson et al. |
| 7,508,530 B1 | 3/2009 | Handman |
| 7,718,351 B2 | 5/2010 | Ying et al. |
| 7,767,130 B2 | 8/2010 | Elsner et al. |
| 7,930,920 B2 | 4/2011 | Le Carpentier |
| RE42,418 E | 6/2011 | Lipmyer |
| 7,993,140 B2 * | 8/2011 | Sakezles ............. G09B 23/306 434/267 |
| 8,454,368 B2 | 6/2013 | Ault et al. |
| 8,481,241 B2 | 7/2013 | Napadensky et al. |
| 8,500,452 B2 | 8/2013 | Trotta et al. |
| 8,616,872 B2 | 12/2013 | Matsui et al. |
| 8,663,326 B2 | 3/2014 | Osman |
| 8,840,404 B2 | 9/2014 | Arthur et al. |
| 8,874,248 B2 | 10/2014 | Young et al. |
| 9,063,029 B2 | 6/2015 | Forbes et al. |
| 9,183,764 B2 | 11/2015 | Sugimoto et al. |
| 9,243,966 B2 | 1/2016 | Beillas et al. |
| 9,315,043 B2 | 4/2016 | Murphy et al. |
| 9,326,860 B2 | 5/2016 | Osman |
| 9,355,575 B2 | 5/2016 | Wang |
| 9,387,658 B2 | 7/2016 | Chen et al. |
| 9,456,884 B2 | 10/2016 | Uckelmann et al. |
| 9,468,467 B2 | 10/2016 | Rathbun et al. |
| 9,505,176 B2 | 11/2016 | Ederer |
| 9,999,509 B2 | 6/2018 | Dikovsky et al. |
| 2002/0079601 A1 | 6/2002 | Russell et al. |
| 2003/0066365 A1 * | 4/2003 | Biermann ............... G01M 7/08 73/866.4 |
| 2004/0099825 A1 | 5/2004 | Huang et al. |
| 2004/0126746 A1 | 7/2004 | Toly |
| 2004/0156478 A1 | 8/2004 | Appleby et al. |
| 2005/0126258 A1 | 6/2005 | Lipmyer |
| 2006/0075826 A1 | 4/2006 | Roberts et al. |
| 2007/0058163 A1 | 3/2007 | Handman |
| 2007/0238081 A1 * | 10/2007 | Koh ..................... G09B 23/285 434/262 |
| 2008/0293029 A1 * | 11/2008 | Wilkins ............... G09B 23/286 434/272 |
| 2009/0246747 A1 * | 10/2009 | Buckman, Jr. ....... G09B 23/285 434/272 |
| 2011/0197688 A1 | 8/2011 | Forbes et al. |
| 2012/0178845 A1 | 7/2012 | Napadensky et al. |
| 2012/0190793 A1 | 7/2012 | Halter et al. |
| 2012/0232857 A1 | 9/2012 | Fisker et al. |
| 2012/0280988 A1 * | 11/2012 | Lampotang .......... G09B 23/285 345/419 |
| 2013/0000426 A1 | 1/2013 | Arthur et al. |
| 2013/0069936 A1 | 3/2013 | Tsai et al. |
| 2014/0017651 A1 | 1/2014 | Sugimoto et al. |
| 2014/0023996 A1 * | 1/2014 | Finn ....................... G09B 25/00 434/72 |
| 2014/0106329 A1 | 4/2014 | Watanabe et al. |
| 2014/0142914 A1 * | 5/2014 | Rapoport ............... A61B 5/055 703/11 |
| 2014/0302306 A1 | 10/2014 | Merkle et al. |
| 2014/0329217 A1 | 11/2014 | Barsness et al. |
| 2015/0025666 A1 | 1/2015 | Olivieri et al. |
| 2015/0032242 A1 | 1/2015 | Schouwenburg et al. |
| 2015/0086955 A1 * | 3/2015 | Poniatowski .......... G09B 23/28 434/267 |
| 2015/0119994 A1 | 4/2015 | Kang et al. |
| 2015/0325151 A1 * | 11/2015 | Tuchschmid .......... A61B 34/20 434/267 |
| 2015/0343708 A1 | 12/2015 | Gerstle et al. |
| 2016/0001469 A1 | 1/2016 | Bacchereti et al. |
| 2016/0046078 A1 | 2/2016 | Sun et al. |
| 2016/0101338 A1 | 4/2016 | Daniels et al. |
| 2016/0115297 A1 | 4/2016 | Norikane et al. |
| 2016/0122723 A1 | 5/2016 | Retting et al. |
| 2016/0148541 A1 * | 5/2016 | Ristolainen ........... G09B 23/30 434/268 |
| 2016/0159006 A1 | 6/2016 | Wang et al. |
| 2016/0287339 A1 | 10/2016 | Rahman et al. |
| 2016/0334780 A1 | 11/2016 | Dair et al. |
| 2016/0372011 A1 * | 12/2016 | Bernal .................. G09B 23/34 |
| 2017/0001439 A1 | 1/2017 | Foresti et al. |
| 2017/0110033 A1 | 4/2017 | Beebe et al. |
| 2017/0301262 A1 | 10/2017 | Vara et al. |
| 2017/0301264 A1 | 10/2017 | Vara et al. |

FOREIGN PATENT DOCUMENTS

| | | |
|---|---|---|
| CN | 202844516 U | 4/2013 |
| CN | 103357157 A | 10/2013 |
| CN | 103400006 A | 11/2013 |
| CN | 203275061 U | 11/2013 |
| CN | 203665958 U | 6/2014 |
| CN | 103966219 A | 8/2014 |
| CN | 104462650 A | 3/2015 |
| CN | 204576946 U | 8/2015 |
| CN | 204924607 U | 12/2015 |
| CN | 103400006 B | 2/2016 |
| CN | 105741354 A | 7/2016 |
| DE | 3503577 C2 | 2/1988 |
| DE | 3715143 C1 | 9/1988 |
| DE | 10356980 A1 | 7/2005 |
| EP | 1388833 B1 | 2/2004 |
| EP | 2072991 A1 | 6/2009 |
| EP | 2098850 A2 | 9/2009 |
| EP | 2 692 509 A1 | 2/2014 |
| FR | 2018158 A1 | 5/1970 |
| FR | 2700206 A1 | 7/1994 |
| GB | 2244843 B | 12/1991 |
| JP | 2006258752 A | 9/2006 |
| JP | 2011508204 A | 3/2011 |
| JP | 5637030 B2 | 12/2014 |
| KR | 20150121525 A | 10/2015 |
| WO | 0238039 A2 | 5/2002 |
| WO | 02038039 A3 | 10/2002 |

(56) References Cited

FOREIGN PATENT DOCUMENTS

| WO | 2015161367 A1 | 10/2015 |
|---|---|---|
| WO | 2015184015 A1 | 12/2015 |
| WO | 2016061148 A1 | 4/2016 |

OTHER PUBLICATIONS

"3D Manufacturing Materials, Oakland Thermoplastics—Studio FATHOM", Oct. 16, 2013 [retrieved onnline Oct. 12, 2018].*
Extended European Search Report and Search Opinion (EP 17 18 0978.3); dated Aug. 30, 2017.
Extended European Search Report and Search Opinion (EP 17 18 0980.9); dated Aug. 30, 2017.
Mendoza, Hannah Rose: "Training Pediatric Surgeons Using 3D Printed Rib Cages", 3Dprint.com, Nov. 3, 2014 (Nov. 3, 2014), XP002766702, Retrieved from the Internet: URL: //3dprint.com/22767/3d-printed-rib-cage/ [retrieved on Feb. 1, 2017] *the whole document*.
Chowdhry, Amit: "How Surgeons Implanted 3D-Printed Titanium Ribs In a Cancer Patient", Forbes, Sep. 19, 2015 (Sep. 19, 2015), XP002766703, Retrieved from the Internet: URL: http://www.forbes.com/sites/amitchowdhry/2015/09/19/how-surgeons-implanted-3d-printed-titanium-ribs-in-a-cancer-patient/#3ca5de9a9a09 [retrieved on Feb. 1, 2017] *the whole document*.
English language abstract for CN202844516U extracted from espacenet.com database on Jul. 25, 2018, 1 page.
English language abstract for CN203275061U extracted from espacenet.com database on Jul. 25, 2018, 1 page.
English language abstract for CN103966219A extracted from espacenet.com database on Jul. 23, 2018, 1 page.
English language abstract for CN104462650A extracted from espacenet.com database on Jul. 23, 2018, 1 page.
English language abstract for CN203665958U extracted from espacenet.com database on Jul. 23, 2018, 1 page.
English language abstract for CN204576946U extracted from espacenet.com database on Jul. 23, 2018, 1 page.
English language abstract for CN204924607U extracted from espacenet.com database on Jul. 25, 2018, 1 page.
English language abstract for CN105741354A extracted from espacenet.com database on Jul. 23, 2018, 1 page.
English language abstract for DE3715143C extracted from espacenet.com database on Jul. 25, 2018, 1 page.
English language abstract for DE10356980A1 extracted from espacenet.com database on Jul. 25, 2018, 1 page.
English language abstract for JP2011508204A extracted from espacenet.com database on Jul. 25, 2018, 1 page.
English language abstract for KR20150121525A extracted from espacenet.com database on Jul. 23, 2018, 1 page.
European Search Report for European Application No. 16193863.4 dated Feb. 15, 2017, 4 pages.
European Search Report for European Patent Application No. EP 18152182.4 dated Mar. 1, 2018, 7 pages.
Doucleff, Michaeleen, "Engineers Create a Titanium Rib Cage Worthy of Wolverine", Nevada Public Radio Organization, Sep. 15, 2015, 4 pages; downloaded from http://www.npr.org/sectios/health-shots/2015/95/15/440361621/engineers-create-a-titani . . . On Oct. 19, 2017.
Lemmen, Paul et al., "An Advanced Thorax-Shoulder Design for the THOR Dummy", Conference Proceedings Article, XP055224574, Jan. 2013, pp. 1-15.
U.S. Appl. No. 15/847,498, filed Dec. 19, 2017, 19 pages.
European Search Report (EP 16202524.1); dated Feb. 21, 2017.
Zeszyty Naukowe et al., Overview and analysis of dummies used for crash tests, Scientific Journals 35(107), Jan. 1, 2013, pp. 22-31, XP055224571.
F. Rengier et al., 3D printing based on imaging data: review of medical applications, International Journal of Computer Assisted Radiology and Surgery, May 15, 2010, pp. 335-341, vol. 5, No. 4, XP055139721.
Senese, Mike, "CES 2015 Printing Carbon Fiber—MarkForged Lets You Print 3D with Carbon Fiber and Kevlar on a Budget", Makezine, Jan. 15, 2015, https://makezine.com/2015/01/15/3d-printed-carbon-fiber-markforged/, 3 pages.

* cited by examiner

THREE-DIMENSIONALLY PRINTED INTERNAL ORGANS FOR CRASH TEST DUMMY

CROSS REFERENCE TO RELATED APPLICATIONS

This application claims the benefit of U.S. Provisional Patent Application Ser. No. 62/264,107, filed on Dec. 7, 2015, and U.S. Provisional Patent Application Ser. No. 62/409,259, filed Oct. 17, 2016, the disclosures of both of which are hereby incorporated by reference in their entireties.

BACKGROUND OF THE INVENTION

1. Field of the Invention

The present invention relates generally to crash test dummies and, more particularly, to three-dimensional organs for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to submit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including neck), rib cage or torso assembly, pelvis assembly, right and left arm assemblies, and right and left leg assemblies. Generally, the arm assembly has an upper arm assembly and a lower arm assembly. The upper arm assembly is typically connected to a shoulder assembly, which, in turn, is typically connected to the spine assembly.

Three-dimensional (3D) printers and rapid prototyping (RP) systems are currently used primarily to quickly produce objects and prototype parts from 3D computer-aided design (CAD) tools. Most RP systems use an additive, layer-by-layer approach to building parts by joining liquid, powder, or sheet materials to form physical objects. The data referenced in order to create the layers is generated from the CAD system using thin, horizontal cross-sections of a CAD model.

Currently, there are no crash test dummies that have the capability of measuring injuries to internal organs during vehicle crash testing. As such, it is desirable to have a crash test dummy with internal organs to measure regional pressures during vehicle crash testing. It is also desirable to have a crash test dummy including internal organs below a diaphragm such as a liver, stomach, spleen, small intestine, and colon. It is further desirable to have a crash test dummy with internal organs that have been adjusted for different force versus deflection properties. It is still further desirable to provide a crash test dummy with an adjusted and varied foam for an internal organ of a crash test dummy. Thus, there is a need in the art for new internal organs having a three-dimensional foam made by a three-dimensional printing process for a crash test dummy.

SUMMARY OF THE INVENTION

Accordingly, the present invention provides a three-dimensional internal organ for a crash test dummy. The three-dimensional internal organ is made of a foam type material and has a plurality of defined and varied cell structures and adapted to be disposed within a torso area of the crash test dummy to measure a regional pressure for the crash test dummy that provides for evaluation of potential abdominal injuries during vehicle crash testing.

Also, the present invention provides a method of making a three-dimensional internal organ for a crash test dummy including the steps of providing a three-dimensional printer and making a CAD model of the three-dimensional internal organ for the crash test dummy. The method also includes the steps of printing, by the three-dimensional printer, the three-dimensional internal organ made of a foam type material with defined and varied cell structures.

In addition, the present invention provides a crash test dummy including a body and a spine assembly operatively attached to the body and a rib cage assembly operatively attached to the spine assembly. The crash test dummy also includes at least one three-dimensional internal organ disposed at least partially within the rib cage assembly. The at least one three-dimensional internal organ is made of a foam type material and has a plurality of defined and varied cell structures to measure a regional pressure for the crash test dummy that provides for evaluation of potential abdominal injuries during vehicle crash testing.

One advantage of the present invention is that a three-dimensional internal organ is provided for a crash test dummy. Another advantage of the present invention is that the crash test dummy includes at least one three-dimensional internal organ that measures potential injuries to a thoracic region of the dummy during vehicle crash testing. Yet another advantage of the present invention is that the three-dimensional internal organ is made of a foam type material. Still another advantage of the present invention is that the three-dimensional internal organ includes defined and varied cell structures. A further advantage of the present invention is that the three-dimensional internal organ may be constructed and/or adjusted for different force versus deflection properties. Yet another advantage of the present invention is that a three-dimensional printing process is used to make internal organs more humanlike than ever before. Still another advantage of the present invention is that the three-dimensional printing process allows printing of two different materials at one printing.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
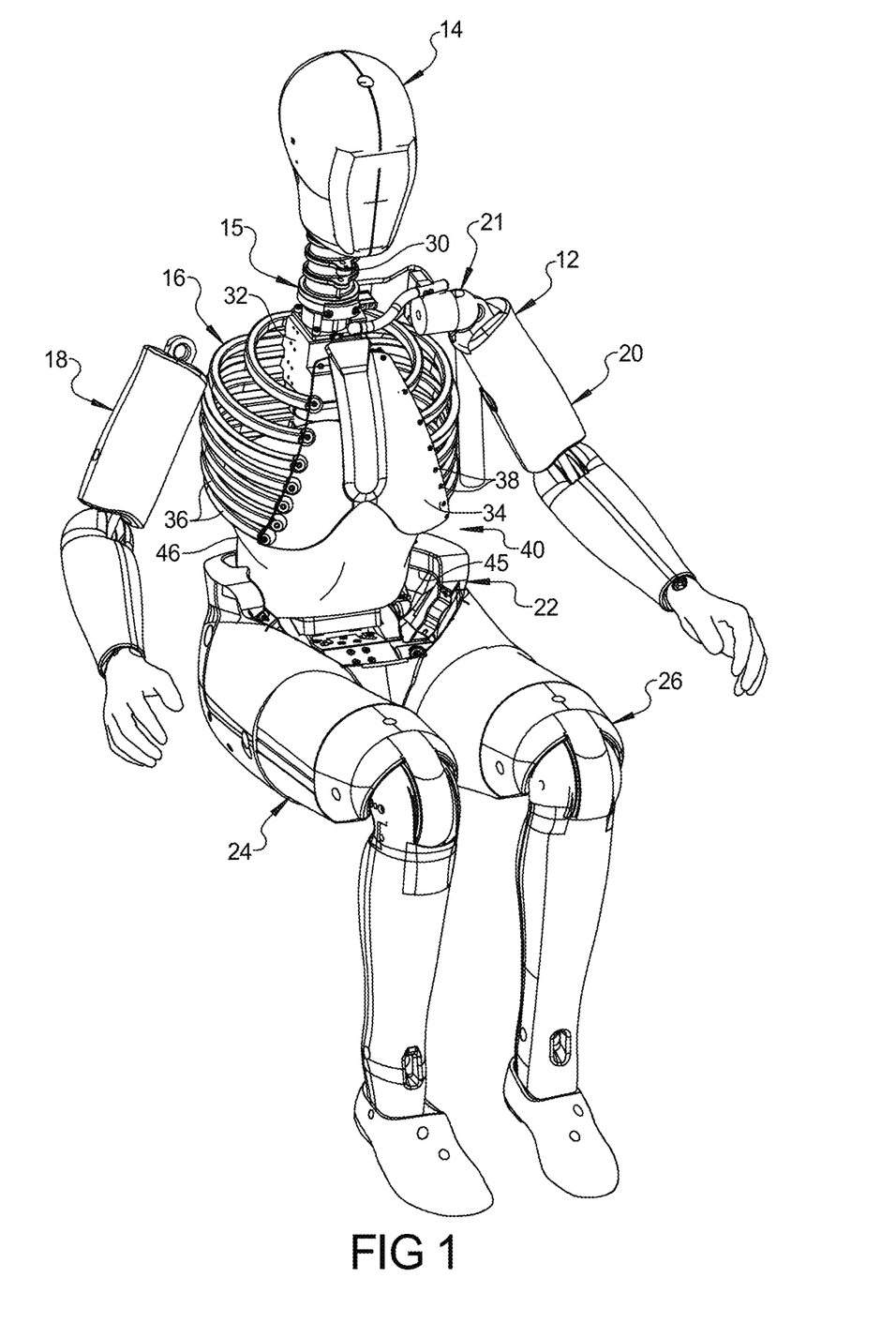
FIG. 1 is a perspective view of a crash test dummy with an internal organ assembly, according to one embodiment of the present invention.

Referring to the drawings and in particular FIG. 1, one embodiment of a crash test dummy, according to the present invention, is generally indicated at 12. In one embodiment, the crash test dummy 12 is of a fiftieth percentile (50%) male type and is illustrated in a sitting position. This crash test dummy 12 is used primarily to test the performance of vehicle interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. It should also be appreciated that the crash test dummy 12 may be of any suitable size.

As illustrated in FIG. 1, the crash test dummy 12 includes a head assembly, generally indicated at 14. The crash test dummy 12 also includes a spine assembly, generally indicated at 15, having an upper end mounted to the head assembly 14 and a lower end extending into a torso area of the crash test dummy 12. It should be appreciated that the spine assembly 15 includes a neck 30 attached to the head assembly 14.

The torso area of the crash test dummy 12 includes a rib cage assembly, generally indicated at 16, connected to the spine assembly 15. The crash test dummy 12 also has a pair of arm assemblies including a right arm assembly, generally indicated at 18, and a left arm assembly, generally indicated at 20, which are attached to the crash test dummy 12 via a shoulder assembly, generally indicated at 21. It should be appreciated that a lower end of the spine assembly 15 is connected to a lumbar-thoracic adapter (not shown), which is connected to a lumbar to pelvic adapter (not shown).

As illustrated in the FIG. 1, the crash test dummy 12 includes a pelvis assembly, generally indicated at 22, connected to the pelvic adapter. The crash test dummy 12 includes a right leg assembly 24 and a left leg assembly 26, which are attached to the pelvis assembly 22. It should be appreciated that various components of the crash test dummy 12 may be covered in a polyvinyl skin such as a flesh and skin assembly for biofidelity of the crash test dummy 12.

The spine assembly 15 includes a spine box 32 connected to the neck 30. As mentioned above, the neck 30 is connected to the head assembly 14. The neck 30 has a lower end connected to the spine box 32 by a suitable attachment such as one or more fasteners (not shown) to the spine box 32. The spine box 32 is connected to the lumbar-thoracic adapter by a suitable mechanism such as one or more fasteners (not shown). It should be appreciated that the fasteners may threadably engage apertures (not shown) in the spine box 32 to secure the neck 30 to the spine box 32 and the spine box 32 to the lumbar-thoracic adapter.

The rib cage assembly 16 includes a sternum 34 spaced forwardly from the spine box 32. The sternum 34 is generally inverted "V" shaped, but may be any suitable shape. The rib cage assembly 16 also includes one or more ribs 36 extending between the spine box 32 and sternum 34. The ribs 36 are generally arcuate in shape and generally rectangular in cross-sectional shape, but may be any suitable shape. The ribs 36 are vertically spaced along the spine box 32 and the sternum 34. The ribs 36 are connected to the spine box 32 and the sternum 34 by a suitable mechanism such as fasteners 38.

Figure 2:
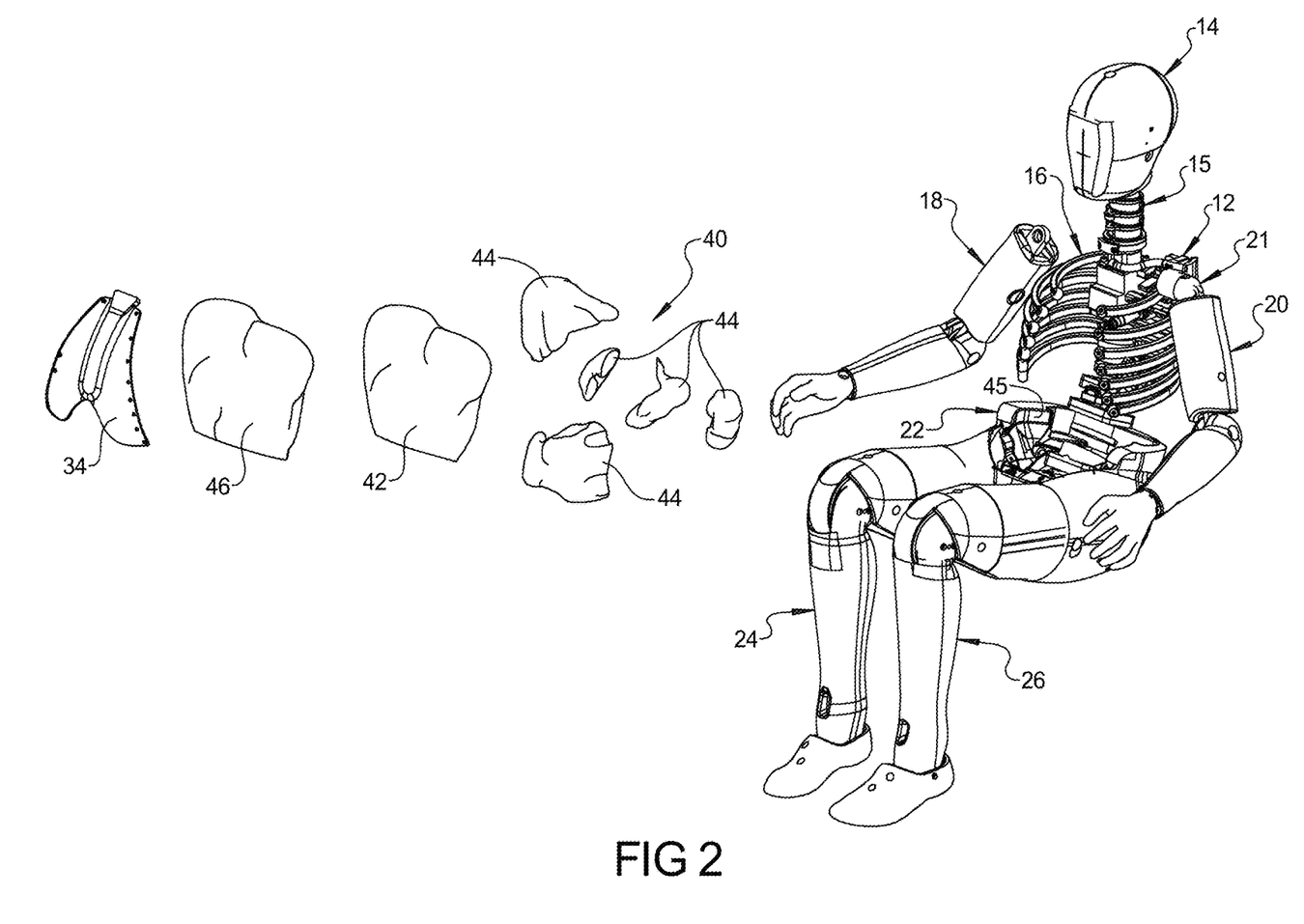
FIG. 2 is an exploded view of the internal organ assembly and the crash test dummy of FIG. 1.
Figure 3:
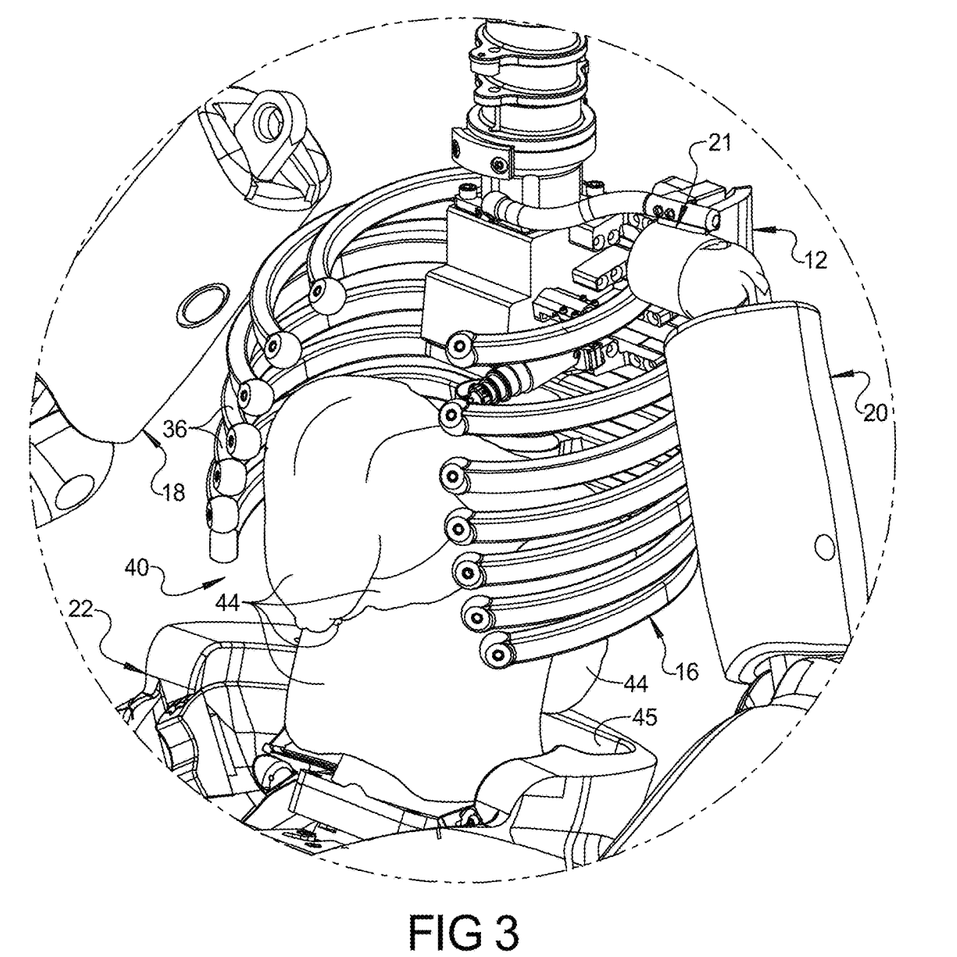
FIG. 3 is a perspective view of the internal organ assembly and the crash test dummy of FIG. 1 with a sternum, a muscle layer, and an organ sac removed.

Referring to FIGS. 1 through 3, one embodiment of an internal organ assembly 40, according to the present invention, is shown for the crash test dummy 12. The internal organ assembly 40 is at least partially disposed in the rib cage assembly 16 and the pelvis assembly 22. The internal organ assembly 40 includes an abdominal or organ sac 42 having one or more three-dimensionally printed internal organs 44 (or regional representation of each organ throughout the organ sac) to measure regional pressures for a crash test dummy 12 that provides for evaluation of potential abdominal injuries during vehicle crash testing. In the embodiment illustrated, the three-dimensionally printed internal organs 44 represent the liver, stomach, spleen, small intestine, and colon. The organ sac 42 is a continuous bag that contains the three-dimensionally printed internal organs 44 and holds the three-dimensionally printed internal organs 44 in place. The organ sac 42 is made of an elastomeric material and molded about the three-dimensionally printed internal organs 44. The organ sac 42 has a portion disposed in the rib cage assembly 16 between the sternum 34 and the spine box 32 and a portion disposed in a cavity 45 of the pelvis assembly 22.

As shown in FIG. 3, the three-dimensionally printed internal organs 44 are located in the crash test dummy 12 based on locations from radiology and other available information sources. The organ sac 42 and the sternum 34 are removed in FIG. 3 to illustrate the position of the three-dimensionally printed internal organs 44. It should also be appreciated that the three-dimensionally printed internal organs 44 are disposed or contained within the organ sac 42. It should further be appreciated that the three-dimensionally printed internal organs 44 have sensors (not shown) to measure regional pressures for the crash test dummy 12 that communicate with an electronic controller (not shown) and provide for evaluation of potential abdominal injuries during vehicle crash testing.

In one embodiment, the sensors are pressure transducers. The pressure transducers may be individually mounted inside each of the three-dimensionally printed internal organs 44. Alternatively, the pressure transducers may be mounted in the organ sac 42 on an exterior of each of the three-dimensionally printed internal organs 44 to measure organ pressure during impacts. More specifically, the pressure transducers may be used to measure pressure increases in each of the three-dimensionally printed internal organs 44 separately during crash test impacts. In a further embodiment, tubes may be coupled to one or more of the three-dimensionally printed internal organs 44 and lead elsewhere within the crash test dummy 12. It should be appreciated that the pressure transducers may be coupled to the tubes to measure pressure differentials throughout crash testing.

The internal organ assembly 40 further includes an abdominal muscle layer 46 to hold the organ sac 42 in place. The muscle layer 46 is a layer covering the organ sac 42. The muscle layer 46 is made of an elastomeric material. It should be appreciated that the muscle layer 46 provides human-like interaction with vehicle restraints.

Figure 4:
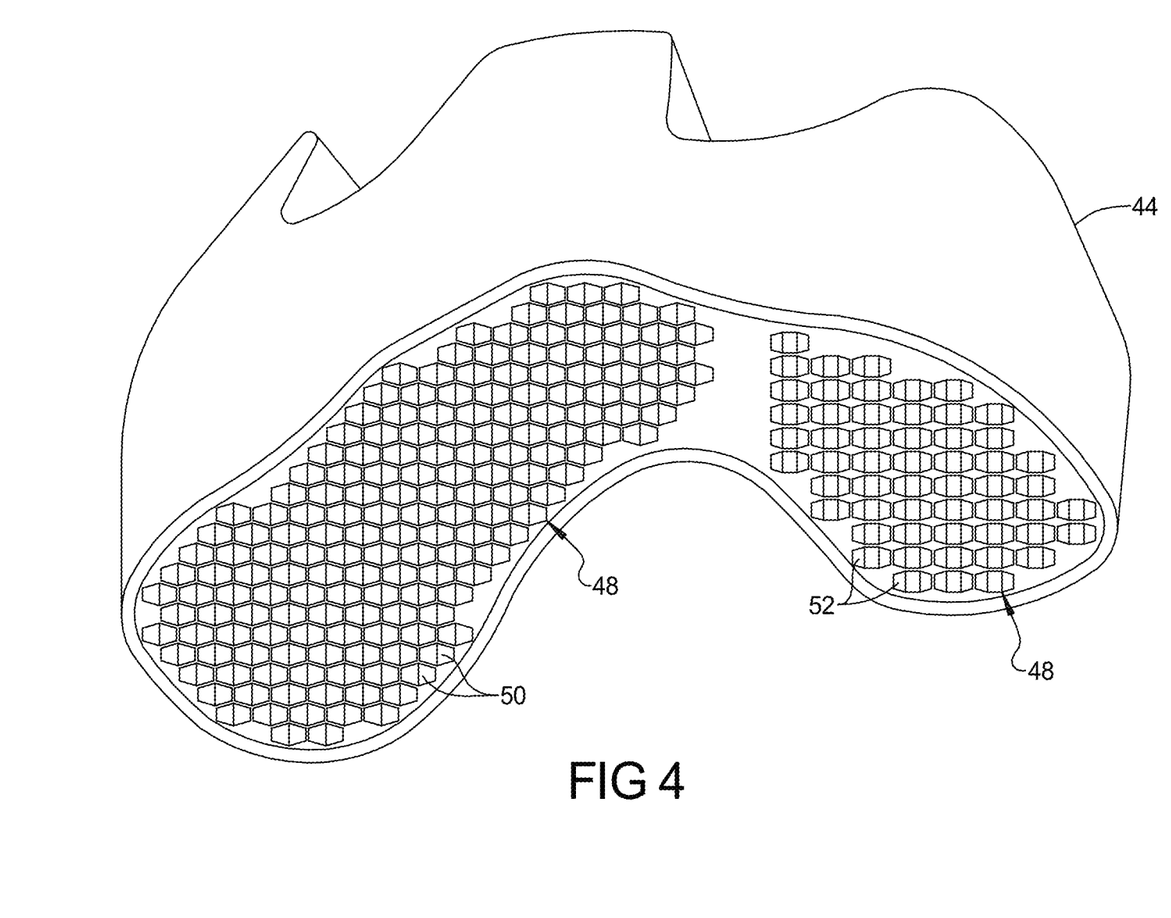
FIG. 4 is a perspective view of one embodiment of a three-dimensional internal organ for the internal organ assembly and crash test dummy of FIG. 1 illustrating a liver and spleen.

Referring to FIG. 4, one embodiment of the three-dimensionally printed internal organ 44 is shown. The three-dimensionally printed internal organ 44 comprises a foam type material. More specifically, the foam material may be comprised of FDM Thermoplastics or Polyjet Photopolymers. In other embodiments, the three-dimensionally printed internal organ 44 may be any material used in conventional three-dimensional printing.

The three-dimensionally printed internal organ 44 includes a plurality of defined and varied cell structures, generally indicated at 48. Said differently, the three-dimensionally printed internal organ 44 includes a plurality of cell structures 48 having predetermined cell structure geometry that varies within the three-dimensionally printed internal organ 44. In one embodiment, the cell structures 48 are generally hexagonal in shape, but may be any suitable shape. As needed to achieve biomechanical requirements.

In the embodiment illustrated, the cell structures 48 extend axially in one direction. In other embodiments, the cell structures 48 may extend axially in any direction. The cell structures 48 may be open or closed cells.

In one embodiment, the cell structures 48 include at least a plurality of first cells 50 and a plurality of second cells 52 different from the first cells 50. In the embodiment illustrated, the second cells 52 have a cross-sectional area larger than a cross-sectional area of the first cells 50. In the embodiment illustrated, the first cells 50 are tessellated using hexagonal cell structures 48 and the second cells 52 are tessellated using octagonal cell structures 48 to better illustrate potential differences in the cell structure 48 available between the first cells 50 and the second cells 52. It should be appreciated that, since it is possible to define a shape of a cell structure 48, different force versus deflection properties inherent in cell structure geometry can be constructed within a single three-dimensionally printed internal organ 44 or between a plurality of three-dimensionally printed internal organs 44 of the crash test dummy 12. It should also be appreciated that the three-dimensionally printed internal organ 44 also permits the use of pressure measurement inside the cavity similar to the method used to measure the pressure inside a post-mortem human subject (PMHS) organ to evaluate for injury. It should further be appreciated that the first cells 50 and second cells 52 may be separated to represent two organs 44.

The three-dimensionally printed internal organ 44 may be produced by any three-dimensional printing process known in the art including, but not limited to Stereolithography (SLA), Digital Light Processing (DLP), Fused Deposition Modeling (FDM), Selective Laser Sintering (SLS), Selective Laser Melting (SLM), Electronic Beam Melting (EBM), and Laminated Object Manufacturing (LOM).

Figure 5:
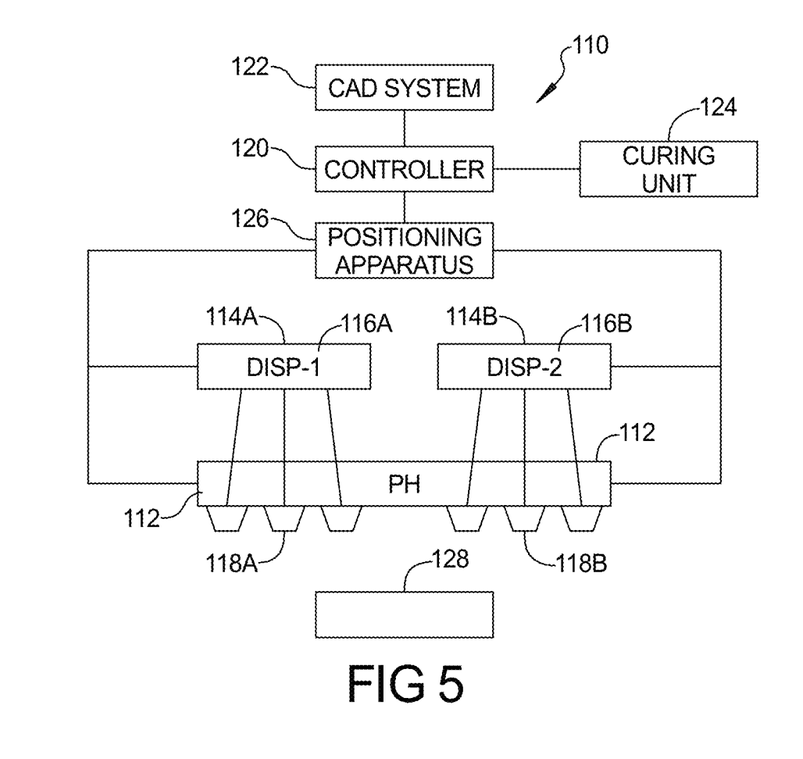
FIG. 5 is a schematic view of one embodiment of a three-dimensional printing system for printing the three-dimensional internal organ of FIG. 4.

Referring to FIG. 5, one embodiment of a three-dimensional printer or printing system using fused deposition modeling is shown. The three-dimensional printer, generally designated 110, includes one or more printing heads 112, and at least two dispensers 114 and individually referenced 114a and 114b, containing printable materials, generally referenced 116 and individually referenced 116a and 116b, respectively. It should be appreciated that other components, and other sets of components, may be used.

The printing head 112 has a plurality of ink-jet type nozzles 118, through which printable materials 116a and 116b are jetted. In one embodiment, a first set of nozzles 118a are connected to the first dispenser 114a, and a second set of nozzles 118b are connected to the second dispenser 114b. Thus, first printable material 116a is jetted through the nozzles 118a, and the second printable material 116b is jetted through nozzles 118b. In another embodiment (not shown), the three-dimensional printing system 110 may include at least a first printing head and a second printing head. The first printing head is connected to the first dispenser 114a and is used to jet the first printable material 116a; and the second printing head 112 is connected to the second dispenser 114b and is used to jet the second printable material 116b.

The three-dimensional printing system 110 further includes a controller 120, a Computer Aided Design (CAD) system 122, a curing unit 124, and optionally a positioning apparatus 126. The controller 120 is coupled to the CAD system 122, curing unit 124, positioning apparatus 126, printing head 112 and each of the dispensers 114. It should be appreciated that control may be effected by other units than shown, such as one or more separate units.

The three-dimensionally printed internal organ 44 is built in layers, the depth of each layer typically being controllable by selectively adjusting the output from each of the ink-jet nozzles 118.

By combining or mixing materials from each of the dispensers 114, wherein each dispenser 114 contains printable material having a different hardness, it is possible to adjust and control the hardness of a resultant material formed from a combination of the printable materials 116 and forming the three-dimensionally printed internal organ 44 being produced. Thus, by combining the first and second printable materials 116 being output from each of the dispensers 114, respectively, different parts of the three-dimensionally printed internal organ 44 having a different modulus of elasticity and consequently a different strength may be produced. Using three-dimensional printing, makes it possible to adjust and make an internal organ with defined and varied cell structures. It should be appreciated that such a three-dimensional printing system is disclosed in U.S. Pat. No. 8,481,241 to Napadensky et al., the entire disclosure of which is hereby incorporated by reference.

In some embodiments, the three-dimensional printing system 110 may print any number of sub-components that may be coupled together either by mechanical fastening or bonding to collectively form a three-dimensionally printed internal organ 44. In other embodiments, individual three-dimensionally printed internal organs 44 may be coupled together.

In one embodiment, one or more of the three-dimensionally printed internal organs 44 have a cover that lines internal organs 44 to enhance durability of the three-dimensionally printed internal organs 44. The cover has a composition comprising a polymeric material and an additive. In one embodiment, the polymeric material is polyvinyl chloride (PVC) and the additive is a plasticizer. More specifically, the cover may have a composition comprising plastisol vinyl.

Figure 6:
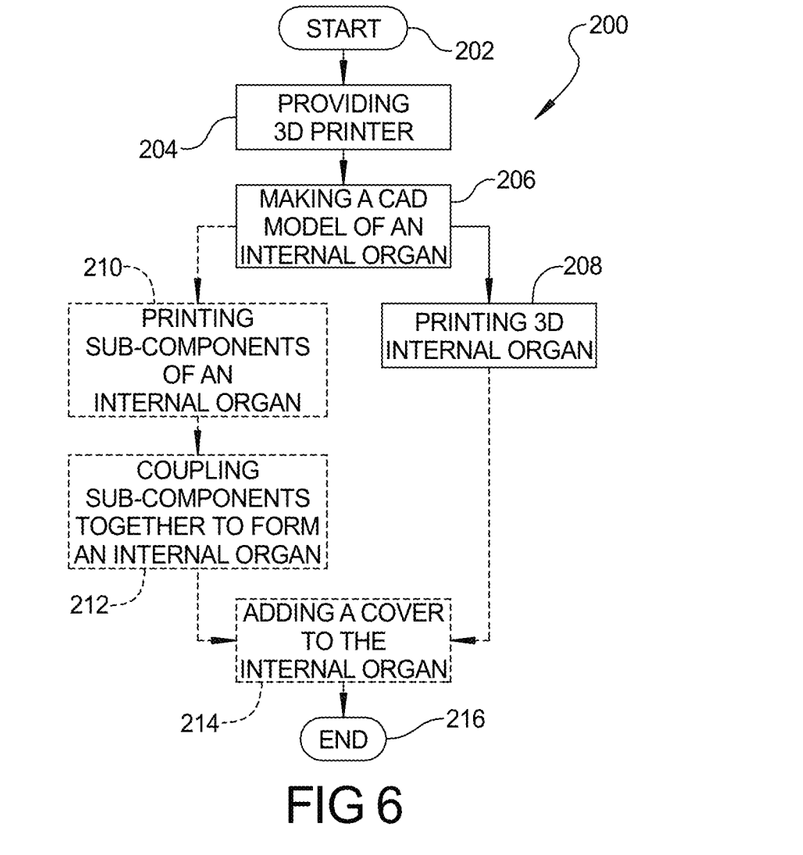
FIG. 6 is a flowchart of a method, according to the present invention, for three-dimensional printing of the three-dimensional internal organ of FIG. 4.

Referring to FIG. 6, the present invention provides a method 200, according to one embodiment of the present invention, of making the three-dimensionally printed internal organ 44 for the crash test dummy 12. The method 200 starts in bubble 202 and advances to block 204. In block 204, the method 200 includes the step of providing a three-dimensional printer or printing system 110. The method 200 advances to block 206 and includes the step of generating a CAD model of the three-dimensionally printed internal organ 44. In one embodiment, a CAD model of the three-dimensionally printed internal organ 44 was made to allow the three dimensional printer to print in one model. The method 200 advances to block 208 and includes the step of printing, by the three-dimensional printer or printing system 110, the three-dimensionally printed internal organ 44 is made of a foam type material with defined and varied cell structures in one printing.

In other embodiments, the method 200 advances from block 206 to block 210 and includes the step of printing sub-components to collectively form an internal organ 44. The method 200 advances to block 212 and includes the step of coupling the sub-components together to collectively form an internal organ 44.

In some embodiments, the method 200 advances from one of block 208 and block 212 to block 214 and includes the step of adding a cover to the internal organ 44 to enhance durability of the internal organ 44 during crash testing. The method 200 concludes at bubble 216.

Accordingly, the internal organ assembly 40 of the present invention allows the crash test dummy 12 to have three-dimensionally printed internal organs 44, according to the present invention, to measure regional pressures and measure potential injuries to a thoracic region of the dummy 12 during crash testing. In addition, the three-dimensionally printed internal organs 44 represent a liver, stomach, spleen, small intestine, and colon. The three-dimensionally printed internal organs 44 are fitted into a molded organ sac 42 to contain the three-dimensionally printed internal organs 44 and hold the three-dimensionally printed internal organs 44 in place to mimic that of a human being. Further, the crash test dummy 12 with the three-dimensionally printed internal organs 44 provides for evaluation of vehicle restraint system testing and is a surrogate to mimic potential abdominal injuries in vehicle restraint system testing for different modes of impact during vehicle crash tests and measures injury to internal organs during vehicle crash testing.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An internal organ for a crash test dummy comprising:
a three-dimensionally printed internal organ comprising a foam material having a plurality of defined and varied cell structures, the three-dimensionally printed internal organ being adapted to be disposed within a torso area of the crash test dummy and to be operatively coupled to a pressure transducer configured to measure regional pressure of the crash test dummy for providing evaluation of potential abdominal injuries during vehicle crash testing.

2. An internal organ as set forth in claim 1 wherein the foam material is FDM Thermoplastics or Polyjet Photopolymers.

3. An internal organ as set forth in claim 1 wherein said cell structures are generally hexagonal in shape.

4. An internal organ as set forth in claim 1 wherein said cell structures include at least a plurality of first cells each having a first cross-sectional area and a plurality of second cells different from said first cells each having a second cross-sectional area.

5. An internal organ as set forth in claim 4 wherein said second cross-sectional area is greater than said first cross-sectional area.

6. An internal organ as set forth in claim 1 further including a cover disposed on an exterior surface of said foam material.

7. An internal organ as set forth in claim 6 wherein said cover comprises plastisol vinyl.

8. An internal organ as set forth in claim 1 wherein each of said defined and varied cell structures extend axially in a same direction.

9. An internal organ as set forth in claim 1 further including one or more pressure transducers mounted inside the foam material.

10. A method of making a three-dimensionally printed internal organ for a crash test dummy, said method comprising the steps of:
providing a three-dimensional printer;
generating a CAD model of the three-dimensionally printed internal organ including defined and varied cell structures for the crash test dummy; and
printing, by the three-dimensional printer based on the CAD model, the three-dimensionally printed internal organ made of a foam material with the defined and varied cell structures.

11. A method as set forth in claim 10 wherein the foam material is FDM Thermoplastics or Polyjet Photopolymers.

12. A method as set forth in claim 10 wherein said step of printing comprises printing the cell structures in a single printing.

13. A method as set forth in claim 10 wherein said step of printing comprises printing at least two sub-components of the internal organ.

14. A method as set forth in claim 13 further including the step of coupling the sub-components of the internal organ together to collectively form the internal organ.

15. A method as set forth in claim 10 wherein the cell structures are generally hexagonal in shape.

16. A method as set forth in claim 10 further including the step of lining the foam material with a cover.

17. A method as set forth in claim 16 wherein the cover comprises plastisol vinyl.

18. A method as set forth in claim 10 wherein the cell structures include at least a plurality of first cells each having a first cross-sectional area and a plurality of second cells different from the first cells each having a second cross-sectional area.

19. A method as set forth in claim 18 wherein the second cross-sectional area is greater than the first cross-sectional area.

20. A crash test dummy comprising:
a body;
a spine assembly operatively attached to said body;
a rib cage assembly operatively attached to said spine assembly and at least partially defining a torso area;
at least one three-dimensionally printed internal organ disposed at least partially within said rib cage assembly and said torso area, said at least one three-dimensionally printed internal organ being made of a foam material having a plurality of defined and varied cell structures; and
a pressure transducer operatively coupled to the at least one three-dimensionally printed internal organ and configured to measure regional pressure of the crash test dummy for providing evaluation of potential abdominal injuries during vehicle crash testing.

21. A crash test dummy as set forth in claim 20 wherein said foam material is FDM Thermoplastics or Polyjet Photopolymers.

22. A crash test dummy as set forth in claim 20 wherein said cell structures are generally hexagonal in shape.

23. A crash test dummy as set forth in claim 20 wherein said cell structures include at least a plurality of first cells each having a first cross-sectional area and a plurality of second cells different from said first cells each having a second cross-sectional area.

24. A crash test dummy as set forth in claim 23 wherein said second-cross sectional area is greater than said first cross-sectional area.

25. A crash test dummy as set forth in claim 20 wherein said at least one three-dimensionally printed internal organ comprises a cover disposed on an exterior surface of said foam material.

26. A crash test dummy as set forth in claim 20 wherein each of said defined and varied cell structures extend axially in a same direction.

27. A crash test dummy as set forth in claim 20 wherein said pressure transducer comprises one or more pressure transducers mounted inside said at least one internal organ.

* * * * *